(12) United States Patent
Bequet

(10) Patent No.: US 7,506,937 B2
(45) Date of Patent: Mar. 24, 2009

(54) LATERAL HONEYCOMB SUPPORT FOR SEAT

(75) Inventor: Pierre Bequet, Châlo St. Mars (FR)

(73) Assignee: Faurecia Sieges d'Automibile S.A., Nanterre (FR)

( * ) Notice: Subject to any disclaimer, the term of this patent is extended or adjusted under 35 U.S.C. 154(b) by 86 days.

(21) Appl. No.: 11/559,914

(22) Filed: Nov. 15, 2006

(65) Prior Publication Data

US 2007/0114831 A1 May 24, 2007

(30) Foreign Application Priority Data

Nov. 15, 2005 (FR) .................................. 05 11586

(51) Int. Cl.
*A47C 7/02* (2006.01)
(52) U.S. Cl. .............................. 297/452.25; 297/452.26; 297/452.34; 5/655.9
(58) Field of Classification Search ............ 297/452.25, 297/452.26, 452.34; 5/655.9
See application file for complete search history.

(56) References Cited

U.S. PATENT DOCUMENTS

| 6,625,830 B2 * | 9/2003 | Lampel ............... 297/452.26 X |
| 7,040,706 B2 * | 5/2006 | Koffler .................. 297/452.25 |
| 7,114,776 B1 * | 10/2006 | Wiltberger ............. 297/452.26 |

FOREIGN PATENT DOCUMENTS

DE          4405595 A1 *  7/1994

* cited by examiner

*Primary Examiner*—Anthony D Barfield
(74) *Attorney, Agent, or Firm*—24IP Law Group; Timothy R. DeWitt

(57) ABSTRACT

A seating element for an automobile vehicle with a cushion formed from a central portion (10) with an exterior face for supporting a user seated on the seat and at least a lateral portion (20) on the door side, the lateral portion (20) being provided with at least one insert (30) lodged in the cushion, and in which the said insert (30) has a directional elasticity resulting in a stiffness in a first direction along the transversal axis with a first value and a stiffness in a second direction perpendicular to the said exterior face for support with a second value inferior to the said first value.

6 Claims, 4 Drawing Sheets

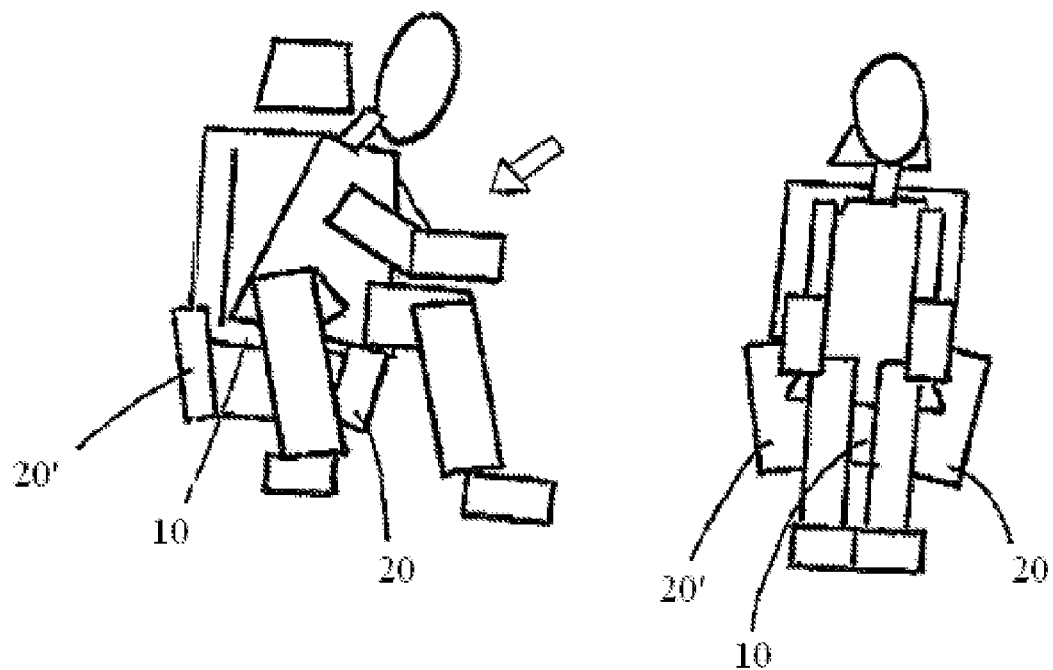
Figure 5a
Figure 5b
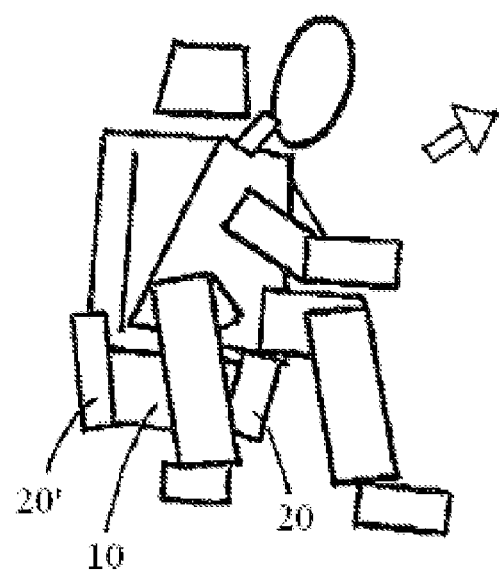
Figure 5c

LATERAL HONEYCOMB SUPPORT FOR SEAT

FIELD OF THE INVENTION

The invention relates to the elements of a vehicle seat, and in particular to the seat cushion for a vehicle seat.

BACKGROUND TO THE INVENTION

The seat in an automobile represents an element for the comfort and the safety of the passengers. An automobile vehicle seat comprises typically a seat cushion and a backrest. The seat comprises a seat frame on which is mounted a cushion covered with seat covering.

The seat cushion and the backrest comprise themselves a central portion and two lateral portions surrounding the central portion. The lateral portions are made as thicker parts and are therefore protruding which ensures the support of the user seated on the seat during the different driving phases. This maybe a particularly desired option when the route is windy and the lateral portions hold the user in a position facing the direction of travel. The resulting support can vary as the function of the physical properties of the padding employed in order to fill the lateral portions, in particular its density and its resistance. However, it is noted that the padding has a tendency to sag which does not allow an optimal support during the different driving phases of the vehicle, in particular when there are bends. However, this allows in turn the user an easy access to the vehicle seat.

One solution consists in providing a rigid insert in the filling of the lateral portions which may be a metallic insert and which reinforces the lateral portions in order for a better support of the user. However this solution has the disadvantage that it does not allow the access to the seat as the lateral portions are not removable after the passenger or the driver is on board.

SUMMARY OF THE INVENTION

The present invention provides a seating element for an automobile vehicle which is able to provide a good lateral support during driving whilst allowing access to the vehicle seat by a user.

The invention provides a seating element for an automobile vehicle comprising a cushion formed by a central portion with an exterior face for supporting a seated user on the seat and at least a lateral protruding portion on the door side. The lateral portion is provided at least with an insert positioned in the cushion and the said insert has a directional elasticity which results in a stiffness in a first direction along the transverse axis with a first value and a stiffness in a second direction perpendicular to the support surface having a second value less than the said first value.

In the following description, the z direction is defined as the vertical direction, the x direction is defined as the direction of movement of the automobile vehicle and the y direction is defined as the transverse direction with respect to the automobile vehicle.

As a result a vehicle seat element is provided with a central portion and two lateral portions, surrounding the central portion, in which the central portion comprises the portion of the seat cushion and a backrest for supporting the user, i.e. the seating element is in the form of a bucket seat such as the car seating elements currently used. An insert is provided which has anisotropic elastic properties, resulting in a stiffness in a first direction along the transverse axis with a first value and a stiffness in a second direction perpendicular to the exterior support surface with a second value less than the said first value. The insert is thus characterised by a resistance to force and a response of the insert under pressure and thus of the protruding lateral portion which is not isotropic and which has two preferred directions.

The two different directions which characterise the response of the insert under pressure can correspond to the preferred directions of the forces when the insert is in use and, in particular, during the driving phases of an automobile vehicle and when the user gets into and out of the vehicle (the entry/exit phase).

In particular, during the driving phases, the forces are applied in a transverse direction in a direction from the inside of the seating element towards the outside of the seating element, i.e. in the y direction. This may be the case during a bend in which the seated user on the seating element experiences a centrifugal force which moves him towards the exterior of the seating element. During entry/exit phases, for example, when the user sits down on the seating element, the forces are approximately applied in a orthogonal direction with respect to an exterior support surface of the lateral portion of the seating element, the lateral portion receiving a strong compressive force.

By ensuring that the first direction is approximately transversal, the forces substantially in play can be taken to account during the driving phases. Indeed, during the driving phases, it is important to ensure a good lateral support, for example during curves the lateral portion can help the driver/passenger to maintain a straight position facing the direction of travel and to prevent him from leaning to one side. As a result the insert has in a transverse direction (the y direction) an elasticity which results in an significant stiffness, thus providing resistance and not being compacted when a transverse force in the y direction is applied to the insert.

In ensuring that the second direction is approximately perpendicular to the exterior support surface of the lateral portion of the seating element, the forces in play when a user sits down on the seat element are taken into account. The orthogonal component to the support surface of the force is the most significant. As a result in order to facilitate access to the seating element of the automobile vehicle it is necessary to provide an insert which has, in a perpendicular direction to the exterior support surface of the lateral portion of the seat element, an elasticity which results in a relatively weak stiffness, such that the insert is compacted when an orthogonal force with respect to said exterior support surface is applied to the said insert, such as the compression forces occuring when a user sits down.

As a result of providing the insert with a elasticity resulting in a greater stiffness in the first transverse direction—the y direction—one can distinguish between the different types of stress applied to the lateral portion of the seat element.

The seat element comprises a cushion into which the filling can be injected. The insert in the cushion can be injected at the same time as the filling or can be placed prior to the filling in a cavity adapted to include at least partially the insert.

The said first direction and the said second direction are preferably approximately orthogonal to each other. Preferably one can therefore take into account any direction of stress using the vector projections in the two preferred directions.

Of course other directions of stress can equally be considered and taken into account by the vector protections in the two preferred orthogonal and transverse directions.

Alternatively, the said insert comprises at least partially a material having a shape memory. The static elastic and dynamic properties may be taken into account for the restoration of the initial position.

Furthermore a material can be used which has thixotropic properties, i.e. has a continuous decrease in apparent viscosity as a function of time when it is subject to shearing forces and which regains its initial state progressively after the shearing stops. In other words, this type of structured material is capable of becoming destructured under shearing forces and is then able to regain its initial state. It would be possible to envisage the use of such of material which becomes destructured and "moves aside" when the compression forces are substantial, such as is the case during access to the seat. The thixotropic effects depend on time and one can choose a material in which the reaction time corresponds to that of a user sitting on the seat element.

Preferably the insert may have an air cell structure, such as a honeycomb. This type of structure allows the variation of the elastic properties of the insert taking into account the materials used, whether for forming the air cell structure or filling the air cells with the same material or with a different material, for interactions between materials between the material forming the air cell structures and the material for filling the air cells, the thickness of the air cells and of the insert.

By giving the air cells of the said insert an approximately hexagonal structure, one can easily obtain an anisotropic insert which has different elastic properties resulting in different stiffnesses along the preferred directions, in particular an orthogonal direction and a transverse direction with respect to the exterior support surface of the lateral portion of the seat element. One can vary the thicknesses of the different sides of the hexagonal air cells, for example increasing the length of the hexagons such that the position of the insert and its orientation increase the non-isotropic properties of the insert. Thus, when a force is applied in a transverse direction from the inside of the seat element towards the outside of the seat elements which may be the case during a bend when the user seated on the seat element is subjected to a centrifugal force which has the effect of moving him towards the outside of the seat elements, the insert has a good rigidity and thus a good lateral support thanks to the position of the insert.

The edges of the air cells are oriented preferably in a transverse direction with respect to the exterior support to surface, in particular in the x direction or the y direction.

Preferably the insert comprises at least a material selected from the group consisting of an elastomeric material and a thermoplastic material.

One can also consider using an elastomeric material which rapidly regains its shape and its initial dimensions after strain disappears, i.e. a material capable of regaining its initial geometry after subject to forces which may be repeated. In the alternative, a thermoplastic material can be used which can be softened or hardened in a temperature range which is characteristic of the chosen material without the properties of the material being changed. All these types of material which are capable of changing shape under stress and then returning to their initial shape once the stress has finished can disappear when the stresses are exerted by the user are significant and, in particular, during access to the seat element, remaining in place during the driving phases thus guaranteeing a good lateral support for the user.

This automobile seating element is preferably a seating cushion of the seating element but a backrest is also envisaged.

DESCRIPTION OF THE DRAWINGS

FIGS. 5A-5C show schematically a seat with a user, when the user sits down on the seat, is seated on the seat and gets up from the.

DETAILED DESCRIPTION OF THE INVENTION

Figure 1:
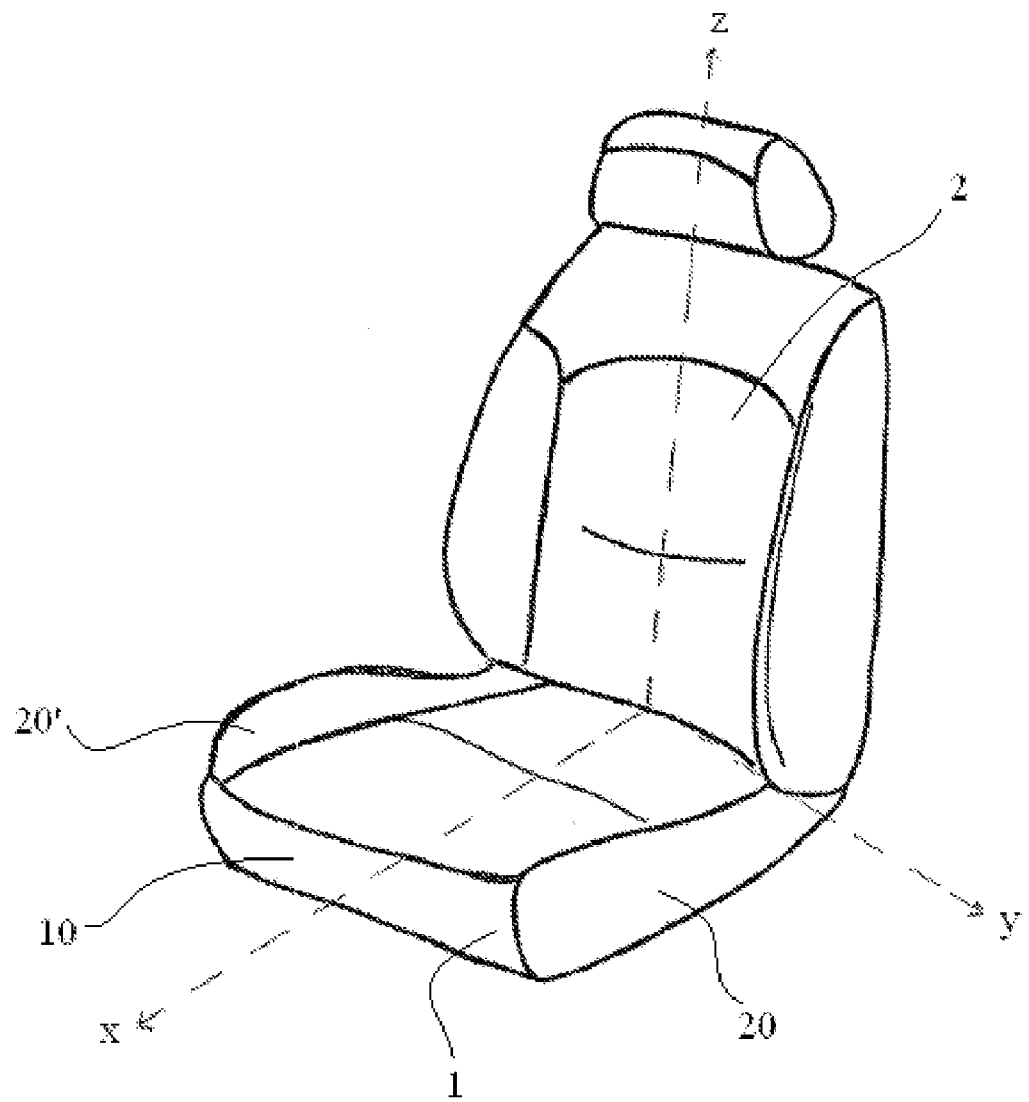
FIG. 1 shows a seat according to the current invention.

A seat in accordance with an example is shown in FIG. 1. The seat comprises a seati cushion, a backrest 2. The seat cushion and the backrest each comprise a central portion 10 surrounded by two lateral portions 20, 20' protruding from and surrounding the central portion 10. The exterior face of the seat cushion and/or the backrest 2 is used to support a user when seated. The lateral portions 20, 20' ensure a good support of the seated user. The seat cushion and the backrest 2 comprise a padding which may be of polyurethane foam covered by a lining.

Figure 2A:
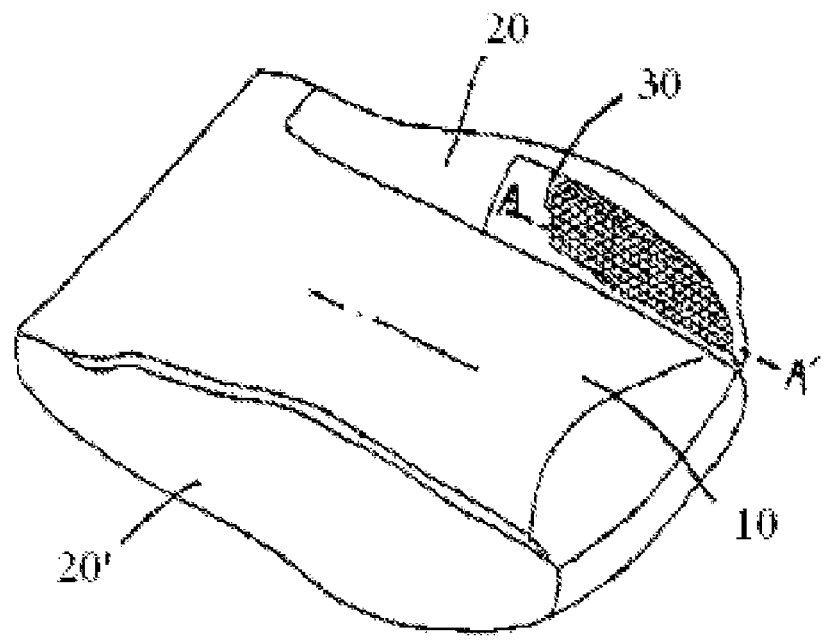
FIGS. 2A and 2B show a seating element of the seat of Figure.
Figure 2B:
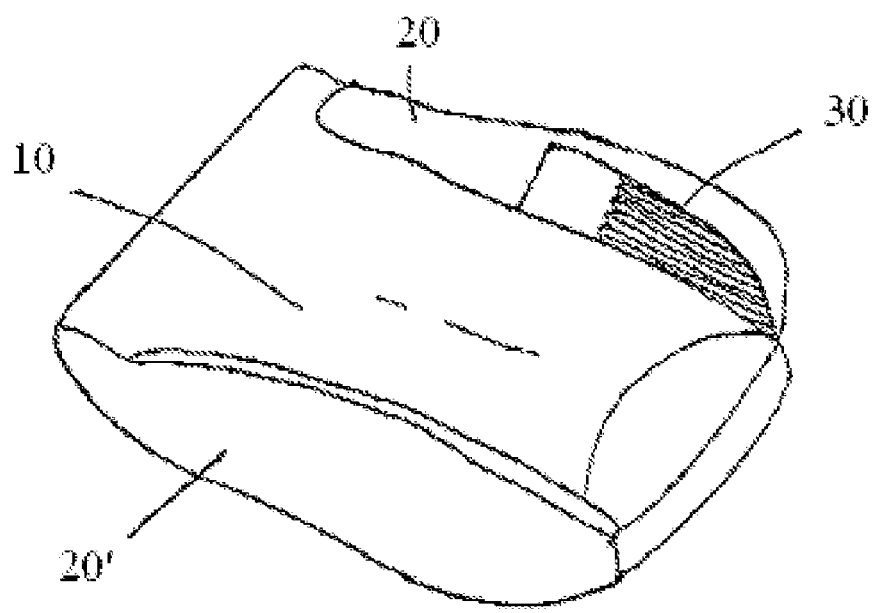

FIGS. 2A and 2B show a seat element of the seat of FIG. 1. The seat element is a seat cushion with a central portion 10 and two projecting lateral portions 20, 20'. The lateral portion 20 projecting beyond the central portion 10 of the seat element comprises an insert 30 in the padding. In particular, the insert 30 is found in the lateral portion 20 at least on the door side. The insert 30 is in an example an air cell insert which may be made from polyurethane and is positioned such that the long sides of the air cells are placed such that their length is in a transverse direction, in particular along the y axis in FIG. 2A and the x axis in FIG. 2B.

Figure 3:
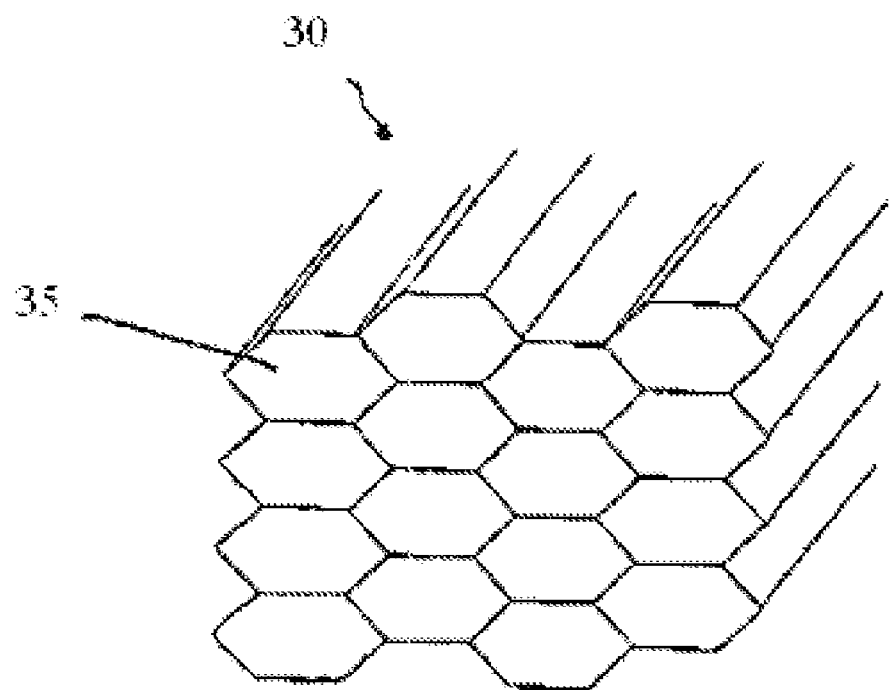
FIG. 3 is a cut-away view along the line A-A' of the seating element of FIG. 2A and shows an insert in a lateral portion of a seating element when no force is applied.

As is better seen in FIG. 3, the air cells 35 of the insert 30 have an elongated hexagonal structure which allows a greater degree of rigidity in one direction compared to the other direction. The insert 30 is positioned such that the long edges of the air cells 35 are placed in a lengthwise direction which is a transverse direction with respect to the exterior support surface of the lateral portion 20 and the central portion 10. In FIG. 3 the long edges of the air cells are oriented along the y axis. However it is equally possible that the long edges of the air cells are oriented along the x axis (FIG. 2B).

Thus, when a force is applied in a transverse direction, for example from the inside of the seat element towards the outside of the seat element, i.e. along the y direction, which may be the case during a bend when the user seated on the seat element is subject to a centrifugal force which makes him move towards the outside of the seat element, the insert 30 has a good rigidity and as a result a good lateral support due to its position.

Figure 4:
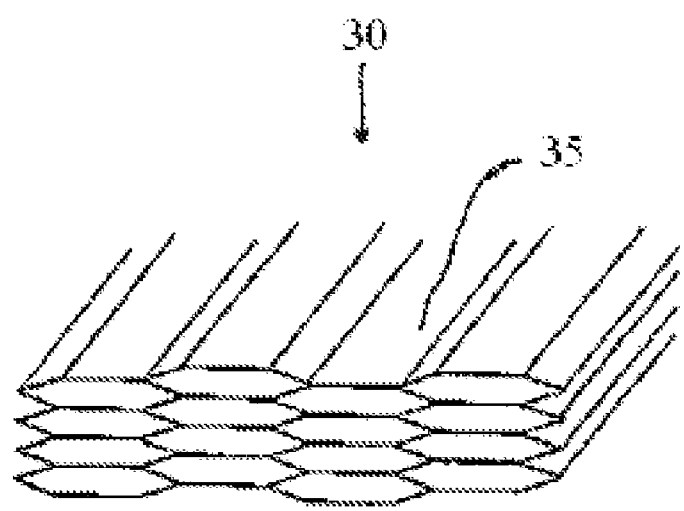
FIG. 4 is a cut-away drawing along A-A' of the seating element of FIG. 2A and illustrates an insert in a lateral portion of a seating element when an orthogonal force is applied to the exterior support surface of the lateral portion of the seating elements.

Equally and illustrated in FIG. 4 when a compression force in an orthogonal direction with respect to the exterior support surface is applied to the projecting lateral portion 20, which may be the case when a user sits down on the seat element, the air cells 35 of the insert 30 which have in a direction at right angles with respect to the exterior support surface of the lateral portion an elasticity leading to a lower stiffness to the stiffness in a transverse direction, are compressed under the weight of the occupant.

In order to better understand the advantages of the insert in the lateral portion of the seat element, FIGS. 5A-5C shows schematically the seat of FIG. 1 with a user, in which a user sits down on the seat, is seated on the seat, and gets up off the seat. When the user sits down or gets up from the seat, shown in FIGS. 5A and 5C respectively, he subjects the exterior support surface of the lateral portion 20 of the seating element to a compression force such that the insert is compressed under the weight of the user and the protruding lateral portion moves thus facilitating access to the seat whether in order to get up from the seat or to sit down.

In FIG. 5B the user is seated on the automobile seat and in particular on the central portion 10 of the automobile seat surrounded by two lateral portions 20, 20'. The lateral portions 20, 20' which project with respect to the central portion ensure a good support of the user.

In summary it is noted that the invention provides a seating element with a padding for an automobile vehicle with a seat cushion and/or a backrest having a central portion with an exterior face used for supporting a user and a lateral portion comprising at least an insert in the cushion. The anisotropic properties of the insert result in a directional elasticity with a stiffness in a first transverse direction having a first value and a stiffness in a second direction perpendicular to the said exterior face and having a second value different from the said first value such that the insert is adapted to provide a good lateral support during driving phases whilst facilitating access to the vehicle seat by a user.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. An automobile seating element, comprising a cushion formed from a central portion with an exterior face for supporting a user seated on the seat, at least one protruding lateral portion on a door side, the lateral portion being provided with at least one insert lodged in the cushion, wherein said insert has a directional elasticity resulting in a stiffness in a first direction along a transverse axis and having a first value and a stiffness in a second direction perpendicular to the exterior face used for supporting and having a second value less than said first value, wherein said first direction and said second direction are approximately orthogonal to each other.

2. An automobile seating element according claim 1, wherein said insert comprises at least partially a material with a shape memory.

3. An automobile seating element according to claim 1, wherein the said insert comprises a cellular structure with air cells.

4. An automobile seating element according to claim 3, wherein air cells of the said insert have a structure which is substantially hexagonal.

5. An automobile seating element according to claim 3, wherein long axes of the air cells are oriented in a direction transverse with respect to an exterior support surface.

6. An automobile seating element according to claim 1, wherein the said insert comprises at least a material chosen from the group consisting of an elastomeric material or a thermoplastic material.

* * * * *